Patented Aug. 19, 1952

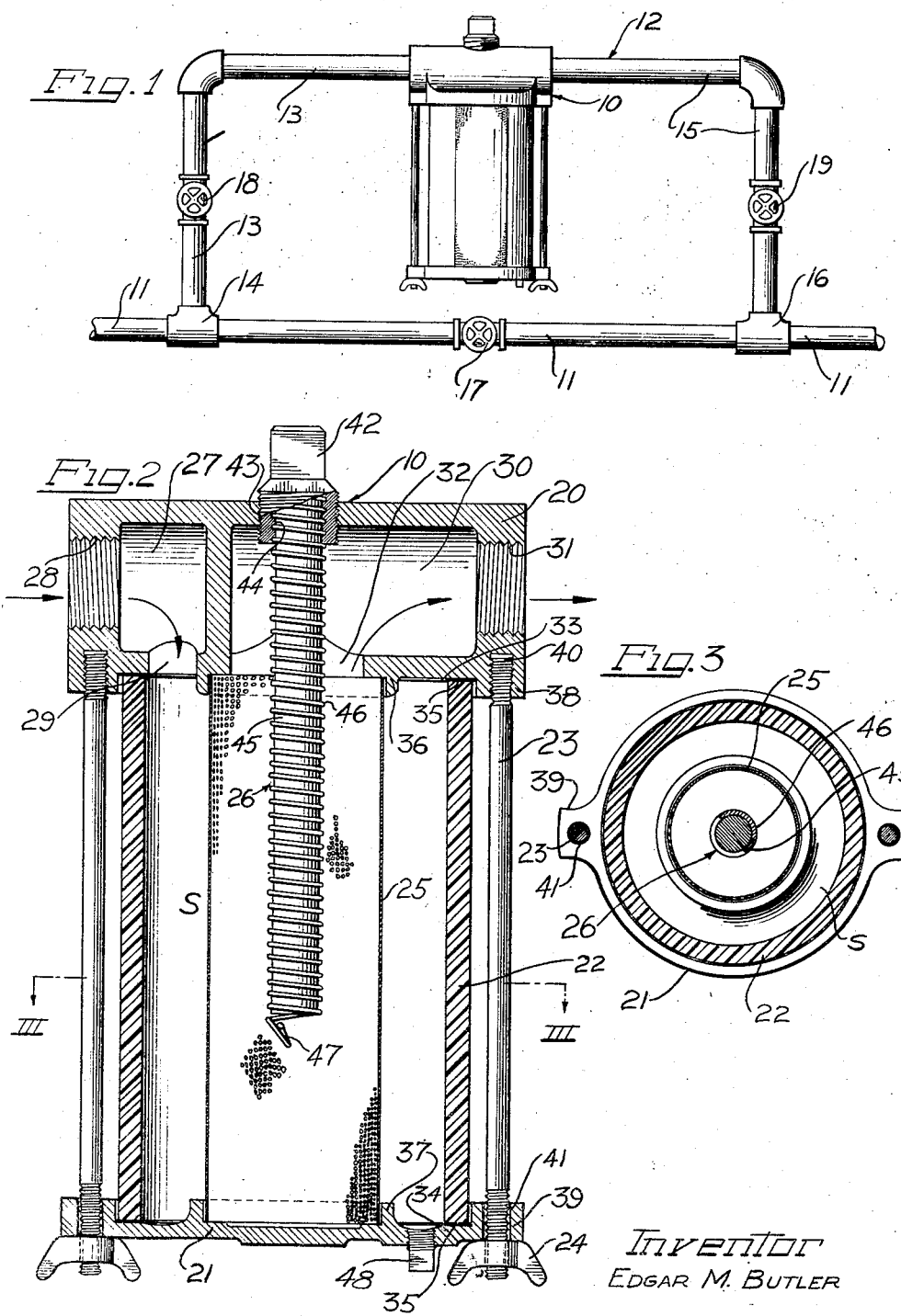

2,607,725

UNITED STATES PATENT OFFICE 2,607,725

ELECTROLYTIC WATER CORRECTION DEVICE AND FILTER COMBINATION

Edgar M. Butler, New Orleans, La., assignor to Butler Engineering Co., Inc., a corporation of Florida Application June 10, 1948, Serial No. 32,105

7 Claims. (Cl. 204—248)

This invention relates to an electrolytic water correction device and filter combination and more particularly to a combined self-energizing electrolytic water correction device and filter for use in a water circulatory system, such as the circulatory system of an internal combustion engine.

It has long been known that the use of "hard" water in the cooling systems of internal combustion engines, and particularly in diesel and automotive vehicle engines, results in the formation of scale on the heat transfer surfaces between the engine and the water cooling system and also upon the internal surface of the pump and of the radiator tubes. This formation of scale not only cuts down the efficiency of heat transfer from the engine to the circulating water, but also necessitates the use of a larger volume of cooling water.

It has been proposed in my copending U. S. applications Serial Nos. 706,741 and 710,312, filed October 30, 1946, and November 16, 1946, respectively (now Patents 2,451,067 and 2,451,068, respectively), that a self-energizing electrolytic water correction device be inserted into the water circulatory systems of internal combustion engines to correct the hardness of the circulating water to prevent the formation of the scale. The present invention utilizes the same general type of self-energizing electrolytic water correction device as those disclosed in my above identified copending application, and further provides a complete and self-contained filter unit for use in conjunction with the water correction device.

The combination filter and water correction device of the present invention not only serves to correct the hardness of water flowing through the circulatory system but also removes any particles of scale or other solid particles present in the water by means of a filter element surrounding a portion of the water correction device. Thus, the water correction device itself is protected from the erosive effect of sharp particles of scale or other particles and the particles are removed from the water circulated through the system to prevent harm to the heat exchange surfaces of the engine and the circulatory system.

In general, the water correction device of the present invention includes a positive element, which may be copper or a copper or silver-plated foundation metal, or other metal below hydrogen in the electromotive force series of metals, and a negative element above hydrogen in the electromotive force series, which is preferably a metal selected from the group consisting of zinc, aluminum and magnesium. In accordance with well-known electro-chemical principles, a device such as that described acts as a galvanic couple when immersed in an aqueous electrolyte, the negative element being electrolytically dispersed into the water to produce metallic ions which immediately combine with the water to give hydrated metallic ions. These metallic ions react with hydroxyl ions to yield insoluble metallic hydroxides. Either the metallic ions or the insoluble metallic hydroxides formed react with or in some way entrain the calcium and magnesium ions present in the water. The result is that a soft sludge is formed rather than the usual hard, adherent scale of limestone that builts up on the heat transfer surfaces in the case of untreated "hard" water.

In addition to preventing scale formation, the use of the self-energizing electrolytic water correction device in the cooling systems of internal combustion engines tends to break up any scale already formed. As a result of the removal of calcium and magnesium ions from the water, the water in contact with any scale already formed is almost free of these ions, and hence has a capacity for dissolving the salt that composes the scale. This action may not be entirely due to complete dissolution of the scale but may be due to the fact that the scale deposit usually comprises two or more salts that differ considerably in solubility, so that the dissolution of the more soluble salt weakens the scale structure sufficiently to cause the scale to fall away from the heat transfer surfaces of its own accord.

In addition, oxygen is removed from the water by electrolytic reduction and reaction with the metallic ions produced as a result of the electrolytic action of galvanic couple so that oxygen corrosion is prevented. The surfaces of the cast iron jacket of the engine remain relatively free of oxides and a more efficient heat transfer to the water cooling system is obtained.

It is, therefore, an important object of the present invention to provide a combined filter and electrolytic water correction device assembly for insertion into a water circulatory system.

It is a further important object of the present invention to provide a combined filter and electrolytic water correction device for insertion into the water circulatory system of an internal combustion engine, the water correction device comprising a galvanic couple functioning to prevent the deposition of scale within the circulatory system and to break up any scale previously formed and the filter element serving to remove any finely divided foreign particles present in the circulating water and prevent erosion or coating of the galvanic couple.

It is a still further important object of the present invention to provide a combined electrolytic water correction device and filter assembly wherein the water correction device is of the type in which the negative element is sheathed in a relatively tightly coiled helical spring which serves not only as the positive element but also as a means for threadingly securing the sheathed device in the combined filter and correction assembly, the filter serving to remove foreign particles from the water in the circulatory system to prevent damage to the heat transfer surfaces of the engine and circulatory system and to prevent erosion and loss of efficiency of the correction device.

Other and further important objects of this invention will be apparent from the disclosure in the specification and the accompanying drawings.

On the drawings:

Figure 1 is a side elevational view of a combined electrolytic water correction device and filter assembly of the present invention, illustrating the assembly inserted in a portion of the cooling system of an internal combustion engine;

Figure 2 is an enlarged longitudinal sectional view of the water correction and filter assembly of Figure 1 with parts in elevation; and Figure 3 is a reduced cross-sectional view taken generally along the line III—III of Figure 2.

As shown on the drawings:

In Figure 1, reference numeral 10 refers to a combined filter and electrolytic water correction assembly of the present invention disposed in a portion 11 of the circulatory system of an internal combustion engine (not shown). The device 10 is suitably positioned in a by-pass 12 connected to the line 11 by means of a T-fitting 14 and inlet line 13 and by an outlet line 15 and T-connection 16. The passage of water through the assembly 10 is controlled by a valve 17 in the line 11 between the T-fittings 14 and 16, and by the inlet valve 18 in the inlet line 13 and the outlet valve 19 in the outlet line 15. By the use of a system such as that illustrated in Figure 1, the flow of water through the main line 11 or through the assembly 10 may be readily controlled. By closing valve 17 and opening valves 18 and 19, all of the water flowing through the system is caused to flow through the inlet line 13, the assembly 10, and out through the outlet line 15 into the main circulating line 11. If it is desired to correct only a portion of the water flowing through the system, then the valve 17 may be partially opened while leaving valves 18 and 19 open. If it is desired to remove the assembly 10, as for cleaning, it is only necessary to close the valves 18 and 19 while opening valve 17 to allow water in the circulatory system to flow directly through line 11. It is then possible to remove the assembly 10 without the possibility of losing any of the coolant, or coolant and anti-freeze in the circulatory system other than that contained in the device 10 itself. This feature is greatly to be desired where an anti-freeze, foam inhibitor or other composition has been added to the circulating coolant.

As shown in Figure 2, the combination filter element and water correction assembly comprises generally an inlet and outlet head 20, a second head 21, an open-ended cylindrical shell 22 of heat-resistant glass, such as that sold under the trade-mark "Pyrex," or suitable plastic material positioned between the heads 20 and 21, and means including bolts 23 and wing nuts 24 for assembling the shell 22 in position between the heads 20 and 21. A filter element 25 is also clamped between the heads in coaxial relationship with but spaced from the shell 22, and a self-energizing electrolytic water correction device 26 is threadedly received by the head 20 and extends through the head into the interior of the filter element 25 in coaxial but spaced relation therewith.

The head 20 is provided with an inlet chamber 27 having a laterally extending, internally threaded intake opening 28 to receive the line 13 (Fig. 1) and a downwardly extending aperture 29 in communication with the interior of the shell 22. An inlet is thus provided from the line 13 through the head 20 into the annular space $s$ between the shell 22 and the filter element 25. The head 20 is also provided with a transversely extending outlet passage 30 having a threaded outlet 31 adapted to receive one end of the outlet line 15 (Figure 1), and a downwardly extending central aperture 32 in communication with the interior of the filter element 25. An outlet from the interior of the filter element 25 is thus provided through the aperture 32, the outlet passage 30 and the threaded aperture 31 to the outlet line 15.

The head 20 is provided with an annular groove 33 in its lower surface and the second head 21 is provided with a corresponding groove 34 to receive the open ends of the cylindrical shell 22 in abutting relation therewith. A pair of fiber washers 35 are provided for each groove to insure a liquid-tight seal between the heads 20 and 21 and the shell 22. The head 20 is also provided with a depending annular boss 36 which is centrally located in the lower surface of the head 20 and is provided with an inner annular shoulder to aid in positioning the filter element 25. The second head 21 is provided with a similar upstanding boss 37 which serves an identical purpose. The filter element 25 is thus positioned between the heads 20 and 21 and held in position by means of the bosses 36 and 37.

The head 20 is provided with a pair of diametrically opposed bosses 38 about the lower outer periphery of the head and the head 21 is provided with corresponding bosses 39. The bosses 38 of the head 20 are threadedly apertured, as at 40, to receive the upper threaded ends of the bolts 23 and the bosses 39 of the head 21 are provided with vertically aligned apertures 41 through which the opposite threaded ends of the bolts 23 can freely pass. The cylindrical shell 22 and the filter element 25 are positioned between the heads, the bolts 23 are threaded into the apertures 40 with the other ends passing through the apertures 41 of head 21. Wing nuts 24 are threaded on the lower ends of the bolts 23 extending through the head 21 and tightened to abut the lower surface of head 21 to clamp the assembly together.

The self-energizing water correction device 26 includes an externally threaded end member or plug 42 which is adapted to be threaded into a corresponding aperture 43 centrally located in the upper surface of the head 20. The plug 42 is also provided with an internally threaded recess 44 for receiving an end of sheathed negative element 45. The element 45 is encased in a positive element sheath 46 comprising a helical coil of wire which is normally of an interior diameter slightly less than the external diameter of the negative element 45, so that when slipped in place over the element 45 the coiled wire will resiliently engage the element to resist relative separation of the two. The coil 46 is provided with a free end 47 which is bent inwardly into a loop to underlie the free end of the negative element 45. The external diameter of the coiled wire sheath 46 is such that the sheathed negative element may be threaded into the threaded recess 26 of the recess 44 of the plug 42 and thus be securely retained therein.

As may be seen in Figure 2, the water correction device 26 extends downwardly into the central hollow portion of filter element 25, the upper portion of the device 26 traversing the outlet chamber 30 of the head 20. The negative element, or cartridge, 45 may be cylindrical in form, as shown, or may be polygonal in cross-section and is preferably formed of zinc, or other metal, such as aluminum or magnesium, that is relatively high in the electromotive force series of metals. The coiled spring wire sheath 46 may be formed of hard copper, bronze, or a ferrous foundation metal having the requisite amount of resiliency, and the surface of the wire may be either copper or silver plated. It will be noted that the coils of the wire sheath 46 are slightly spaced to permit easy access of the water to the surface of negative element 45. Although the coils of the wire sheath 46 are rather tightly wound about the core 45, the water, by capillary action, will penetrate between the coils and the surface of the negative element 45.

The water, containing dissolved substances, is capable of acting as an electrolyte to set up a galvanic action between the dissimilar elements of the negative element core 45 and the wire sheath 46, or the coating metal thereof. The innermost coils of the wire sheath in contact with the surface of the negative element core, or in closely spaced relation thereto, create a myriad of galvanic couples, each of which serves to bring about the electrolytic action previously described.

It will be noted that water entering the inlet chamber 27 of the assembly passes through the aperture 29 into the annular space between the cylindrical shell 22 and the filter element 25. The filter element 25 may be formed of closely woven wire or may be, as illustrated, of sheet metal formed into cylindrical form and having a number of relatively small apertures formed therein. Water contained in the annular space within the shell 22 passes through the filter element 25, which functions to strain any discrete particles suspended in the water. The filtered water then passes through the outlet 32 into the outlet chamber 30, and thence into the outlet line 15. The water coming into contact with the self-energizing electrolytic water correction device 26 will have been filtered by the element 25 to remove any discrete particles therefrom and the water will be in contact with the self-energizing electrolytic water correction device during the flow from the interior of the assembly into the outlet chamber. A plug 48 is provided in the head 21, by means of which the solid material filtered from the water by filter element 25 may be removed without the necessity of interrupting the flow of water through the device. The random movement imparted to the water passing through the filter element 25 will serve to bring the water into contact with substantially the entire length of the water correction device so that the effective treatment of the water passing through the assembly may be accomplished.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A combined filter and self-energizing electrolytic water correction device comprising a shell, a pair of heads, one of which is transversely apertured to provide a fluid inlet and an outlet in communication with the interior of said shell, a hollow filter element concentric with and in spaced relation to said shell and abutting the inner faces of said heads, means holding said heads, shell and filter element in assembled relation with said inlet communicating with the space between said shell and said filter element and said outlet communicating with the interior of said filter element, and a self-energizing electrolytic water correction device carried by one of said heads and extending into the interior of said hollow filter element, said water correction device thus being interposed between said filter element and said outlet for the electrolytic correction of filtered water flowing therethrough.

2. A combined filter and electrolytic water correction device for use in a water circulatory system comprising a cylindrical shell, a cylindrical filter element, a pair of heads having grooves for receiving the ends of said shell, and annular bosses formed in their inner faces for receiving said filter element, means for clamping said cylindrical shell, said filter element and said heads in assembled relation, said filter element being concentric with but spaced from said cylindrical shell, one of said heads being transversely apertured to provide a fluid inlet communicating with the annular space between said filter element and said shell and an outlet communicating with the interior of said filter element to receive therefrom substantially solids-free water, and a self-energizing electrolytic water correction device removably secured within one of said heads and extending into the interior of said cylindrical filter element for contact with substantially solids-free water therein, said water correction device comprising a negative element core and a positive element sheath in the form of a helical wire coil resiliently gripping the surface of said core throughout substantially the entire length thereof.

3. A combined filter and self-energizing electrolytic water correction device for use in the circulatory system of an internal combustion engine comprising a cylindrical outer shell, a cylindrical filter element, a pair of heads, means for clamping said shell, said filter element and said heads in assembled relation with said filter element and said shell in concentric, spaced relation and having their ends in contact with the inner surfaces of said heads, one of said heads being transversely apertured to provide an inlet in communication with the annular space between said shell and said filter element and an outlet in communication with the interior of said filter element, and a self-energizing electrolytic water correction device threadedly retained in said apertured head and having a negative element core extending transversely of said fluid outlet into the interior of said filter element and a positive element sheath in the form of a helical coil of wire resiliently engaging the surface of said element throughout substantially the entire length thereof, said filter serving to remove foreign particles from the circulating fluid and said water correction device serving to electrolytically correct water passing therethrough.

4. A combination filter element and self-energizing electrolytic water correction device comprising a cylindrical shell, a cylindrical filter element, a pair of heads having interior faces contoured to receive the ends of said shell and said filter element, means for clamping said shell, said filter element and said heads in assembled relation with said filter element being confined within said shell between said heads, one of said heads being transversely apertured to provide a fluid inlet and an outlet in communication with the interior annular space between said shell and said head and with the interior of said filter element respectively, and a plug threadedly received by said transversely apertured head and having a centrally located threaded aperture formed therein, a self-energizing electrolytic water correction device extending transversely across said outlet aperture and into the interior of said filter element and having a negative element core and a positive element sheath in the form of a helical coil of wire resiliently gripping the surface of said negative element throughout substantially the entire length thereof, said positive element sheath providing threads whereby the water correction device may be threadedly retained in the central threaded aperture of said plug to maintain the water correction device in position within the assembly.

5. A combined filter and self-energizing electrolytic water correction device comprising a shell, a pair of heads, one of which is transversely apertured to provide a fluid inlet and an outlet in communication with the interior of said shell, a self-energizing electrolytic water correction device carried by one of said heads and extending axially of said shell into the interior thereof, a hollow filter element coaxial with and surrounding that portion of said water correction device extending into the interior of said shell, and means for holding said heads, shell and filter element in assembled relation with the filter element abutting the inner faces of said heads with said inlet communicating with the space between said shell and said filter element and with said outlet communicating with the interior of said filter element, said water correction device thus being positioned in the path of flow of filtered water passing from said inlet through said filtered element to said outlet.

6. A combined filter and self-energizing electrolytic water correction device comprising a cylindrical shell, a pair of heads connected to opposite ends of said cylindrical shell, said shell and heads comprising a unitary compact housing for the combined filter and water correction device, one of said heads having a water inlet and a water outlet for connection as a unit of the housing in a water circulatory system, a self-energizing electrolytic water correction device carried by said one head centrally thereof and extending generally axially of said cylindrical shell and in spaced relation thereto within the housing, means for filtering within the housing and generally concentric with and in spaced relation to said water correction device and connected to said heads, said water correction device being between said filtering means and said outlet, means connected to said housing adjacent said water inlet for diverting water entering said housing toward said filtering means, means in said one head affording a hollow open-ended conduit connect at one end remote from said water correction device with said water outlet and extending generally transversely of said housing and terminating at the other end remote from said water outlet and centrally of and within said housing and adjacent one end of said water correction device.

7. A combined electrolytic water correction device and filter, comprising a unitary compact hollow filter casing and a pair of heads closing the ends of said casing, one of said heads providing a water inlet and a water outlet for connection as a unit in a water circulatory system for flow of water through the casing, filter means in said casing supported by and between said heads, a galvanic couple mounted within said filter means and connected to said one head and extending generally axially of and centrally of said hollow casing, and means adjacent said water inlet for shielding the water outlet from the water inlet to circulate water entering the casing along the filter means therein prior to its exit from the casing, said galvanic couple being between said filter means and said outlet.

EDGAR M. BUTLER.

REFERENCES CITED

The following references are of record in the file of this patent:

UNITED STATES PATENTS

| Number | Name | Date |
|---|---|---|
| 577,134 | Harrison | Feb. 16, 1897 |
| 1,058,113 | Stuckel | Apr. 8, 1913 |
| 1,999,913 | Merritt | Apr. 30, 1935 |
| 2,011,031 | Birch | Aug. 13, 1935 |
| 2,095,407 | Baucom et al. | Oct. 12, 1937 |
| 2,415,067 | Wallace | Jan. 28, 1947 |
| 2,451,068 | Butler | Oct. 12, 1948 |